March 4, 1947.　　　　C. DOWLING　　　　2,416,825
FEEDER AND EXERCISER
Filed March 13, 1944　　　　2 Sheets-Sheet 1
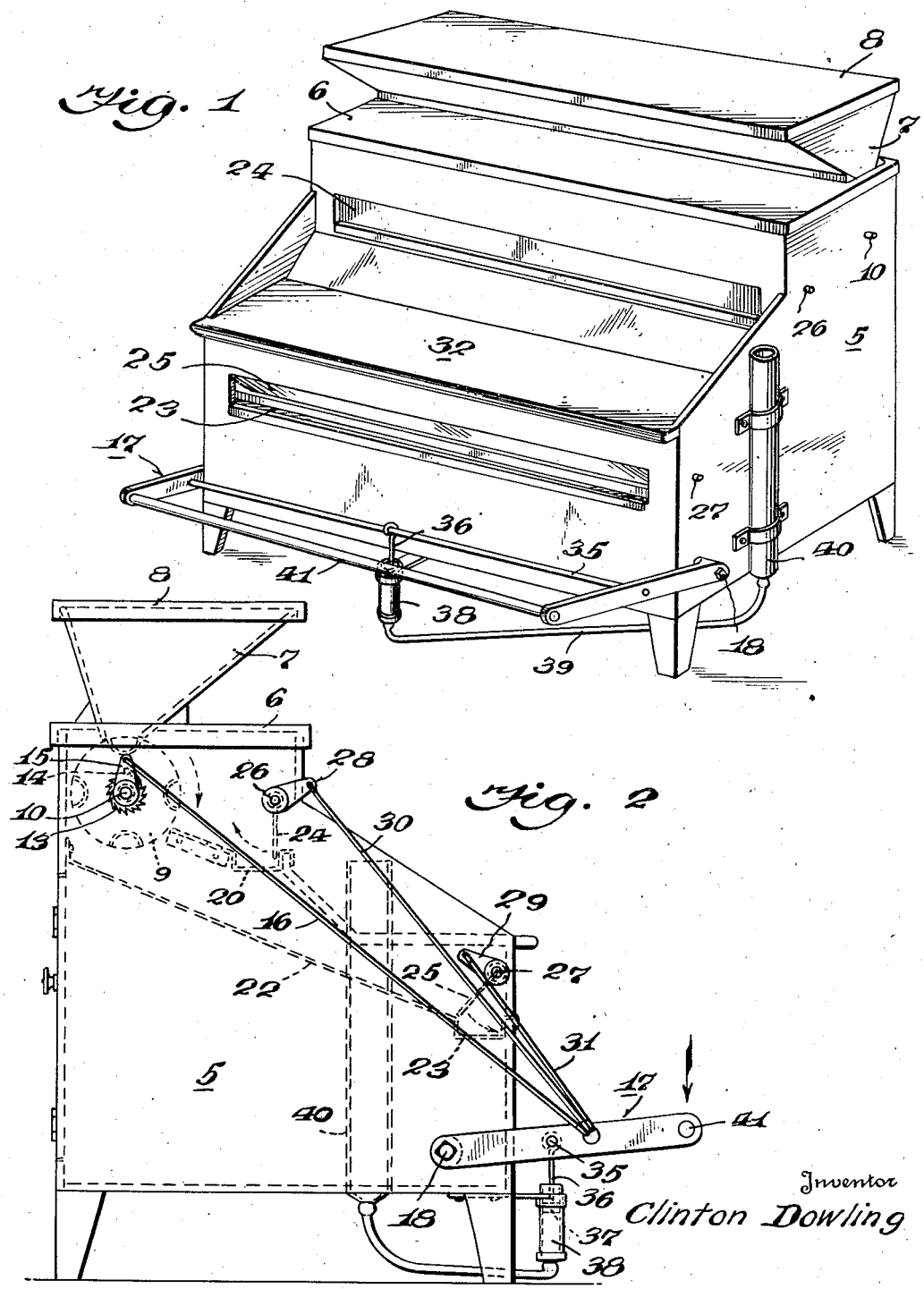
Inventor
Clinton Dowling
By Barry & Cyr
Attorneys March 4, 1947.  C. DOWLING  2,416,825
FEEDER AND EXERCISER
Filed March 13, 1944  2 Sheets-Sheet 2

Inventor
Clinton Dowling,
By Barry & Cyr
Attorneys

Patented Mar. 4, 1947

2,416,825

UNITED STATES PATENT OFFICE 2,416,825

FEEDER AND EXERCISER

Clinton Dowling, Bethesda, Md., assignor of eight per cent to John K. Althaus, eight per cent to Robert K. Althaus, sixteen per cent to Raymond A. Vogeley, and sixteen per cent to Carl R. Meininger Application March 13, 1944, Serial No. 526,239

4 Claims. (Cl. 119—55)

This invention relates to improvements in feeders and exercisers, and while it has been designed for use by poultry or fowl, it is conceivable that it might, also, be employed by livestock.

The primary object of the invention is to provide a feeder designed to be operated by chickens or the like, and which will require the chickens to exercise in order to obtain feed.

Another object is to supply a feeder and exerciser especially useful where chickens or the like must be confined in a small space normally affording them insufficient exercise.

A still further object is to provide a combined feeder and exerciser which will prevent the waste of feed.

With the foregoing objects outlined and with other objects in view which will appear as the description proceeds, the invention consists in the novel features hereinafter described in detail, illustrated in the accompanying drawings, and more particularly pointed out in the appended claims.

In the drawings:

Fig. 1 is a perspective view of my improved feeder and exerciser.

Fig. 2 is a side elevation of the same.

Figures 3, 4:
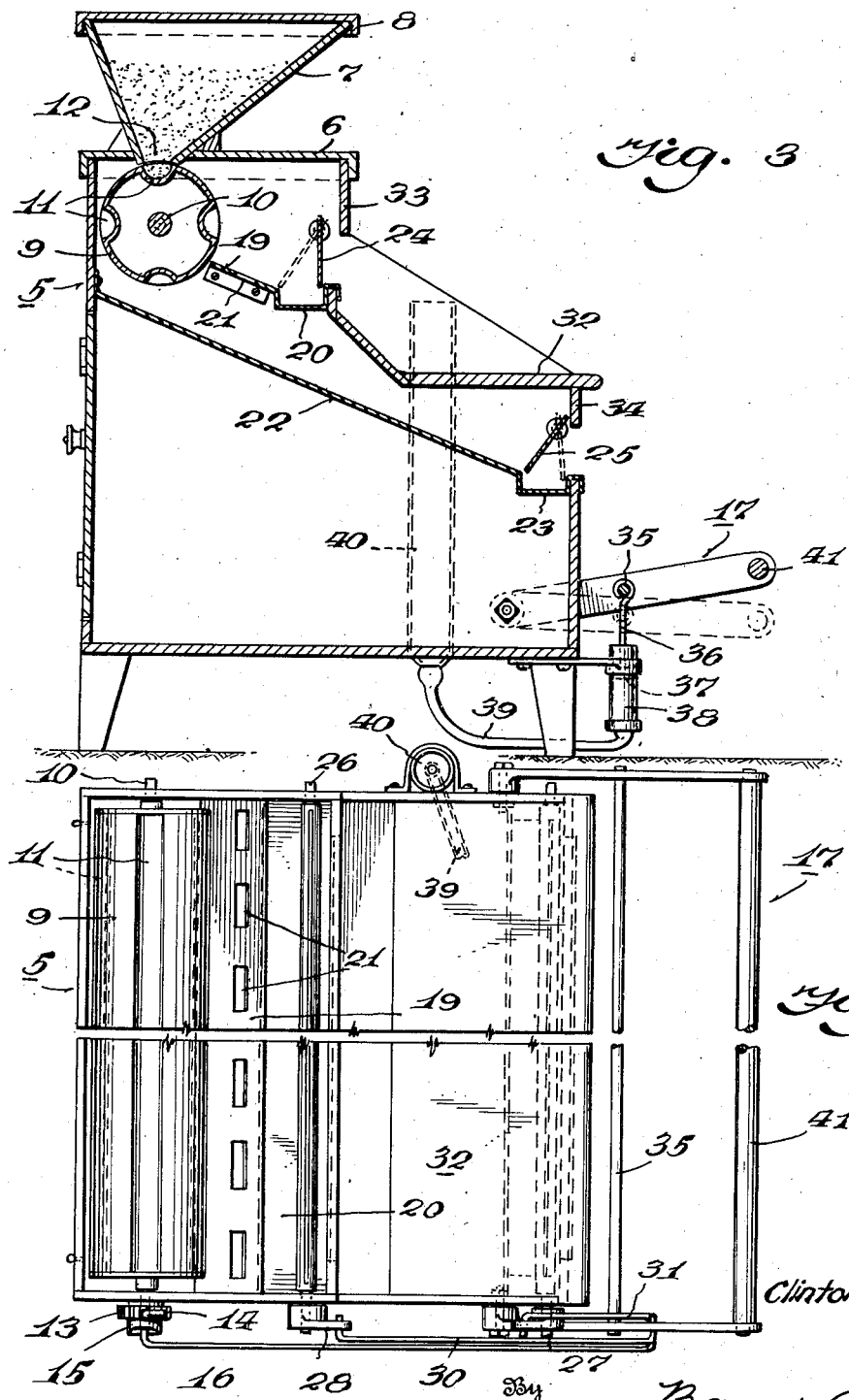
Fig. 3 is a vertical sectional view.
Fig. 4 is a top plan view with the top of the housing and supply hopper removed.

Referring to the drawings, 5 designates a housing provided with a removable top 6 supporting a supply hopper 7 having a cover 8. Arranged within the housing, immediately below the hopper, is a drum 9 having a horizontal shaft 10 journaled in the sides of the housing. The drum is provided with a series of longitudinally extending peripheral pockets 11 adapted to be brought successively beneath the outlet 12 of the hopper 7. The drum is intermittently rotated by the following means: As best shown in Fig. 2, the shaft 10 is provided at one end with a rigidly fixed ratchet wheel 13, actuated by a pawl 14 pivotally mounted on a lever 15, freely rotatable on the shaft. A link 16 has one of its ends pivotally connected to the outer end of the lever and its other end connected to a depressible means or treadle 17 pivotally connected at 18 to the sides of the housing for movement about a horizontal axis. It will be obvious that the swinging movement of the treadle will cause the pawl 14 to turn the ratchet wheel 13, and as the latter is fixed to the shaft 10 of the drum 9, the drum will be caused to rotate in a clockwise direction, so that feed in a pocket 11 will be transferred to a forwardly and downwardly inclined plate 19 fixedly arranged within the housing immediately forward of the drum. Feed deposited on the plate will tend to gravitate forwardly toward an upper feed trough or holder 20, but as the plate is perforated, as indicated at 21, some of the feed will fall through the plate onto a lower forwardly and downwardly inclined plate 22 that is fixedly arranged in the housing and terminates at a lower feed trough or holder 23. Due to this construction about one-half of the feed deposited on the upper plate 19 will move into the trough 20, and the remainder will move into the trough 23.

A pivoted valve or shutter 24 cooperates with a doorway directly forward of the upper trough, and a similar valve or shutter 25 with a doorway immediately forward of the lower trough, and the valves are so actuated that one is open to expose the trough with which it is associated, while the other one is closed, and vice versa. The valve 24 is fixed to a horizontal rock shaft 26, and the valve 25 to a horizontal rock shaft 27. These shafts are provided respectively with fixed external arms 28 and 29, and the arms are connected respectively by links 30 and 31 to the treadle 17 so as to be actuated by the latter.

A platform 32 and walls 33 and 34 are so associated with the troughs 20 and 23 as to provide the doorways leading to the troughs, and it will be understood that these openings are alternately opened and closed by the valves 24 and 25.

The treadle is provided with a horizontal bar 35, pivotally connected to the rod 36 of a piston 37 working in a dash-pot cylinder 38, fixed to the front portion of the housing. The cylinder is connected by a restricted tube 39 to another open cylinder 40 fixedly arranged at one side of the housing. The cylinders are designed to contain any suitable liquid that may rise and fall in the cylinder 40, and it will be understood that after the treadle has been depressed, if the weight is removed therefrom, the liquid will descend in the cylinder 40 and rise in the cylinder 38, so as to cause the piston 37 and rod 36 to return the treadle to its uppermost position. However, as the tube 39 forms a restriction between the two cylinders, there will be a time lapse in the passage of the liquid from one cylinder to the other, with the result that the treadle cannot rapidly descend or rise, but will slowly partake of such movements.

Operation

Assuming that the device is used for the feeding and exercising of chickens and a certain amount of feed occupies each trough 20 and 23, parts will normally be in the positions indicated in Figs. 2 and 3. Now if a chicken steps upon the horizontal rod 41 of the treadle, it can feed from the trough 23 because the valve 25 of that trough is open while the valve 24 of the trough 20 is closed. As the chicken feeds from the lower trough, the treadle will gradually descend and close the valve 25, and, therefore, if the chicken desires further feed, it must move upwardly onto the platform 32, because at this time the valve 24 has been opened to expose the feed in the trough 20. While the chicken feeds from the trough 20, the liquid in the cylinder 40 will gradually descend and return the treadle 17 to its uppermost position and cause the closing of the valve 24. Hence, if the chicken wants further feed, it will have to descend to the treadle and can feed from the trough 23. Obviously, this cycle will be repeated as often as required, and each time a chicken or chickens cause depression of the treadle 17, the drum 9 will be turned to deposit additional feed in the troughs 20 and 23.

While I have disclosed what I now consider to be a preferred embodiment of my invention in such manner that the same may be understood by those skilled in the art, it is apparent that changes may be made in the details disclosed without departing from the spirit of the invention as expressed in the appended claims.

What I claim and desire to secure by Letters Patent is:

1. A feeder and exerciser comprising a housing having a plurality of doorways one arranged above the other, a feed holder arranged in the housing immediately adjacent each doorway, valves controlling said doorways, and means including a depressible member arranged exteriorly of the housing and operatively connected to said valves for holding one valve in closed position while the other valve is in open position and vice versa.

2. A feeder and exerciser comprising a housing provided with upper and lower horizontally disposed doorways, a platform arranged at the exterior of the housing between said doorways, a feed holder positioned in the housing immediately adjacent each doorway, a valve for controlling each doorway, and means including a depressible member operatively connected to said valves for holding one valve in closed position while the other valve is in open position and vice versa.

3. A feeder and exerciser comprising a housing provided with upper and lower horizontally disposed doorways, a platform arranged at the exterior of the housing between said doorways, a feed holder positioned in the housing immediately adjacent each doorway, valves for controlling said doorways, each valve being in the form of a flap movable about a horizontal axis, and means including a depressible member operatively connected to said valves for holding one valve in closed position while the other valve is in open position and vice versa.

4. A feeder and exerciser comprising a housing having a plurality of doorways one above the other, a feed holder arranged in the housing immediately adjacent each doorway, valves controlling said doorways, and means including a depressible treadle arranged at the exterior of the housing and operatively connected to said valves for holding one valve in closed position while the other valve is in open position and vice versa, the last-mentioned means comprising a dash-pot connected to the treadle and arranged to yieldingly resist downward movement thereof and to gradually return the treadle to its uppermost position.

CLINTON DOWLING.

REFERENCES CITED

The following references are of record in the file of this patent:

UNITED STATES PATENTS

| Number | Name | Date |
|---|---|---|
| 431,337 | Danley | July 1, 1890 |
| 997,189 | Grierson | July 4, 1911 |
| 1,559,347 | Moore | Oct. 27, 1935 |
| 2,502,314 | Haggart | Nov. 17, 1942 |
| 272,703 | Jones | Feb. 20, 1883 |
| 496,068 | Snyder | Apr. 25, 1893 |
| 1,865,921 | Kohl | July 5, 1932 |
| 876,154 | Dumond | Jan. 7, 1908 |
| 376,489 | Swam | Jan. 17, 1888 |
| 1,493,299 | Vickers | May 6, 1924 |

FOREIGN PATENTS

| Number | Country | Date |
|---|---|---|
| 624,926 | French | Apr. 16, 1927 |